(12) United States Patent
Li et al.

(10) Patent No.: US 12,739,868 B2
(45) Date of Patent: Sep. 15, 2026

(54) DATA TRANSMISSION METHOD FOR WIRELESS PERIPHERAL DEVICE

(71) Applicant: Primax Electronics Ltd., Taipei (TW)

(72) Inventors: Chun-Chi Li, Taipei (TW); Chien-Nan Lin, Taipei (TW); Yun-Jung Lin, Taipei (TW); Chih-Feng Chien, Taipei (TW); Chun-Nan Su, Taipei (TW)

(73) Assignee: Primax Electronics Ltd., Taipei (TW)

( * ) Notice: Subject to any disclaimer, the term of this patent is extended or adjusted under 35 U.S.C. 154(b) by 322 days.

(21) Appl. No.: 18/396,048

(22) Filed: Dec. 26, 2023

(65) Prior Publication Data

US 2025/0176010 A1 May 29, 2025

(30) Foreign Application Priority Data

Nov. 23, 2023 (CN) ........................ 202311575032.X

(51) Int. Cl.
*H04W 72/56* (2023.01)
*H04L 5/00* (2006.01)

(52) U.S. Cl.
CPC ........... *H04W 72/56* (2023.01); *H04L 5/0055* (2013.01)

(58) Field of Classification Search
CPC ...... H04W 72/56; H04W 4/80; H04L 5/0055; H04L 1/1854; H04L 1/1861; H04L 1/1685; G06F 2203/0384
See application file for complete search history.

(56) References Cited

U.S. PATENT DOCUMENTS

2016/0323881 A1* 11/2016 Bhora ........................ H04L 1/00
2017/0238286 A1* 8/2017 Chun .................... H04W 72/21 370/329
2022/0173763 A1* 6/2022 Lin ........................ H04L 1/1607
2022/0191929 A1* 6/2022 Aboul-Magd .... H04W 74/0816
2023/0239946 A1* 7/2023 Lee ........................ H04W 76/15 370/329
2025/0158764 A1* 5/2025 Xin ................... H04W 74/0808

* cited by examiner

*Primary Examiner* — Ricky Q Ngo
*Assistant Examiner* — Kabir U Jahangir
(74) *Attorney, Agent, or Firm* — KIRTON McCONKIE; Evan R. Witt

(57) ABSTRACT

A data transmission method for use between a wireless transmitter and a wireless receiver of a wireless peripheral device is provided. In a frequency hopping procedure, the wireless transmission data is transmitted through a dynamically selected secondary transmission channel. The frequency range of the dynamically selected secondary transmission channel is the farthest from the frequency range of the primary transmission channel. Consequently, the transmission efficiency is enhanced. Moreover, the wireless receiver issues a special acknowledgement packet with loadable information to the wireless transmitter. Consequently, the master control power of the frequency hopping procedure is switched from the wireless transmitter to the wireless receiver. In addition, the information control capability of the wireless receiver to control the wireless transmitter in the communication application level can be increased.

8 Claims, 9 Drawing Sheets

DATA TRANSMISSION METHOD FOR WIRELESS PERIPHERAL DEVICE

FIELD OF THE INVENTION

The present invention relates to a data transmission method, and more particularly to a data transmission method for use in a frequency hopping procedure of a wireless peripheral device.

BACKGROUND OF THE INVENTION

Nowadays, a variety of wireless peripheral devices are widely used. For example, the wireless peripheral devices include a wireless mouse, a wireless keyboard, a wireless microphone, a wireless headset or any other possible wireless electronic device. In accordance with the data transmission technology, a frequency hopping procedure is used to prevent plural wireless peripheral devices from simultaneously using the same frequency band (e.g., 2.4 GHz) during the data transmission process. Consequently, the interference between the plural wireless peripheral devices can be avoided. By using the frequency hopping procedure, the original primary transmission channel is hopped to an additional primary transmission channel. Consequently, the wireless transmission data can be correctly transmitted and received.

FIG. 1A is a schematic functional block diagram illustrating the relationship between a conventional wireless peripheral device and a main system. As shown in FIG. 1A, the conventional wireless peripheral device comprises a wireless receiver 81 (e.g., a wireless mouse dongle) and a wireless transmitter 82 (e.g., a mouse body). The wireless receiver 81 is electrically connected with a USB port 11 of a main system 10 directly. Moreover, under control of a wireless transmitting/receiving control software/firmware 101, the wireless receiver 81 and the wireless transmitter 82 are in communication with each other to transmit/receive a wireless transmission data D1.

FIG. 1B is a flowchart illustrating a data transmission method for use in a frequency hopping procedure of a conventional wireless peripheral device. The data transmission method comprises a data sending process and a data receiving process. In addition, the data transmission method at least comprises the following steps. Please also refer to FIG. 1A.

In a step S10, the data transmission method is started.

Then, a step S11 is performed to judge whether the wireless receiver 81 receives the wireless transmission data D1 from the wireless transmitter 82 through a primary transmission channel within a first time interval.

If the judging result of the step S11 indicates that the wireless receiver 81 receives the wireless transmission data D1 through the primary transmission channel, the wireless receiver 81 processes the wireless transmission data D1 and continuously receives additional wireless transmission data through the primary transmission channel (Step S12). Then, the step S11 is performed again.

If the judging result of the step S11 indicates that the wireless receiver 81 has not received the wireless transmission data D1, the wireless transmitter 82 confirms an additional primary transmission channel that has not been occupied (Step S13).

If the wireless receiver 81 is unable to receive the wireless transmission data D1, the wireless transmitter 82 issues a primary transmission channel change notification through at least one secondary transmission channel in a broadcast polling manner (Step S14).

After the step S14, a step S15 is performed to judge whether the wireless receiver 81 receives the primary transmission channel change notification from the wireless transmitter 82 through the at least one secondary transmission channel within a second time interval.

After the wireless receiver 81 responds to the confirmation of receiving the primary transmission channel change notification, the wireless transmitter 82 re-sends the same wireless transmission data D1 or sends the additional wireless transmission data to the wireless receiver 81 through an additional primary transmission channel that has not been occupied (Step S16), and the step S11 is performed again.

From the steps S13 to S16, it can be found that the conventional data transmission method still has some drawbacks. For example, the wireless transmitter 82 has to issue the primary transmission channel change notification through at least one secondary transmission channel. After the wireless receiver 81 responds to the confirmation of receiving the primary transmission channel change notification, the wireless transmitter 82 re-sends the same wireless transmission data D1 or sends the additional wireless transmission data. Under this circumstance, a transmission delay problem occurs.

However, the conventional data transmission method still has some drawbacks. From the steps S13 to S16, it can be found that the master control power of the frequency hopping procedure is manipulated and activated by the wireless transmitter 82. However, if a single wireless receiver cooperates with plural wireless transmitters, the conventional data transmission method is infeasible or difficult to be implemented.

SUMMARY OF THE INVENTION

An object of the present invention provides a data transmission method for use in a wireless peripheral device. While a frequency hopping procedure is performed, the same wireless transmission data can be re-sent through a dynamically selected secondary transmission channel. The frequency range of the dynamically selected secondary transmission channel is the farthest from the frequency range of the primary transmission channel. Consequently, the transmission efficiency is enhanced.

Another object of the present invention provides a data transmission method for use in a wireless peripheral device. While a frequency hopping procedure is performed, the primary transmission channel is switched to a dynamically selected secondary transmission channel. The frequency range of the dynamically selected secondary transmission channel is identical or close to the frequency range of the primary transmission channel. Consequently, the transmission efficiency is enhanced.

Another object of the present invention provides a data transmission method for use in a wireless peripheral device. While a frequency hopping procedure is performed, the master control power of the frequency hopping procedure in the wireless peripheral device is switched from the wireless transmitter to the wireless receiver.

Another object of the present invention provides a data transmission method for use in a wireless peripheral device. While a frequency hopping procedure is performed, a wireless receiver of the wireless peripheral device issues an acknowledgement packet with loadable information. Consequently, the information control capability of the wireless receiver to control a wireless transmitter of the wireless peripheral device in the communication application level can be increased.

In accordance with an aspect of the present invention, a data transmission method for use between a wireless transmitter and a wireless receiver of a wireless peripheral device is provided. The data transmission method includes a data receiving process. The data receiving process is implemented by the wireless receiver. The data receiving process at least includes the following steps. Firstly, a step (a) is performed to judge whether a wireless transmission data from the wireless transmitter is received through a primary transmission channel within a first time interval. In a step (b), if the wireless transmission data from the primary transmission channel is received, the wireless receiver is temporarily switched to a transmitting mode, and the wireless receiver sends back a first acknowledgement packet to the wireless transmitter, which is temporarily switched to a receiving mode. In a step (c), the wireless transmission data from the primary transmission channel is recognized and processed, additional wireless transmission data is continuously received through the primary transmission channel, and the step (a) is performed again. In a step (d), if the wireless transmission data is not received through the primary transmission channel, the transmission channel is switched to a dynamically selected secondary transmission channel. Among plural secondary transmission channels, the secondary transmission channel that is not interfered and whose frequency range is the farthest from a frequency range of the primary transmission channel has the highest priority to be selected as the dynamically selected secondary transmission channel by the wireless receiver. Then, a step (e) is performed to judge whether the same wireless transmission data through the dynamically selected secondary transmission channel is received within a second time interval. In a step (f), if the wireless transmission data is received through the dynamically selected secondary transmission channel, the wireless receiver is temporarily switched to the transmitting mode, and the wireless receiver sends back a second acknowledgement packet to the wireless transmitter, which is temporarily switched to the receiving mode. The second acknowledgement packet contains at least one of a primary transmission channel change information, a wireless receiver time sequence information and an application function information for controlling the wireless transmitter. The wireless transmitter sends the additional wireless transmission data through an additional primary transmission channel in response to the primary transmission channel change information. In a step (g), the wireless transmission data from the dynamically selected secondary transmission channel is recognized and processed, the additional wireless transmission data is continuously received through the additional primary transmission channel that has not been occupied, and then the step (a) is performed again.

In an embodiment, after the step (d) and before the step (e), the data transmission method further includes the following steps. In a step (d1), if the wireless transmission data is not received through the primary transmission channel, a check procedure is performed to check whether the second acknowledgement packet has been stored in a buffer storage space. In a step (d2), if the second acknowledgement packet has been stored in the buffer storage space, the step (e) is performed. In a step (d3), if the second acknowledgement packet has not been stored in the buffer storage space, the wireless receiver adds the primary transmission channel change information to the second acknowledgement packet and stores the second acknowledgement packet in the buffer storage space, and the step (e) is performed.

In an embodiment, after the step (a) and before the step (b), the data transmission method further includes the following steps. If the wireless transmission data from the primary transmission channel is received, a step (a1) is performed to judge whether an acknowledgement request from the wireless transmitter is received. In a step (a2), if no acknowledgement request from the wireless transmitter is received, the step (c) is performed. In a step (a3), if the acknowledgement request from the wireless transmitter is received, the wireless receiver is temporarily switched to the transmitting mode, and the wireless receiver sends back the first acknowledgement packet to the wireless transmitter, which is temporarily switched to a receiving mode. Then, the step (c) is performed.

In an embodiment, in the step (f), a frequency range of the additional primary transmission channel is determined by the wireless receiver, and the frequency range of the additional primary transmission channel is identical or close to the frequency range of the dynamically selected secondary transmission channel.

In an embodiment, the primary transmission channel and the additional primary transmission channel are included in plural primary transmission channels.

In an embodiment, the data transmission method further includes a data sending process. The data sending process is implemented by the wireless transmitter. The data sending process at least includes the following steps. In a step (h), a triggering event is waited. In a step (i), the wireless transmitter sends the wireless transmission data through the primary transmission channel in response to the triggering event. Then, a step (j) is performed to judge whether the first acknowledgement packet from the wireless receiver is received. In a step (k), if the first acknowledgement packet from the wireless receiver is received, the step (h) is performed again. Consequently, the wireless transmitter continuously waits for another triggering event. If the first acknowledgement packet from the wireless receiver is not received, a step (l) is performed to judge whether a sending failure count of the wireless transmitter exceeds a first threshold value within a third time interval. In a step (m), if the sending failure count of the wireless transmitter does not exceed the first threshold value, the step (i) is performed again. Consequently, the wireless transmitter continuously sends the wireless transmission data through the primary transmission channel. In a step (n), if the sending failure count of the wireless transmitter exceeds the first threshold value, the wireless transmitter sends the same wireless transmission data through the dynamically selected secondary transmission channel. Among the plural secondary transmission channels, the secondary transmission channel that is not interfered and whose frequency range is the farthest from the frequency range of the primary transmission channel has the highest priority to be selected as the dynamically selected secondary transmission channel by the wireless transmitter. Then, a step (o) is performed to judge whether the second acknowledgement packet from the wireless receiver is received. The second acknowledgement packet contains at least one of the primary transmission channel change information, the wireless receiver time sequence information and the application function information for controlling the wireless transmitter. In a step (p), if the second acknowledgement packet containing the primary transmission channel change information and from the wireless receiver is received, the wireless transmitter sends the additional wireless transmission data through the additional primary transmission channel in response to the primary transmission channel change information. Then, the step (h) is performed again. If the second acknowledgement packet containing the primary transmission channel change information and from the wireless receiver is not received, a step (q) is performed to judge whether the sending failure count of the wireless transmitter exceeds a second threshold value and all of the plural secondary transmission channels have been broadcast-polled within a second time interval. If the wireless transmitter does not exceed the second threshold value or all of the plural secondary transmission channels have not been broadcast-polled, the wireless transmitter continuously sending the same wireless transmission data through the dynamically selected secondary transmission channels until the sending failure count of the wireless transmitter exceeds the second threshold value and all of the plural secondary transmission channels have been broadcast-polled. Then, the step (h) is performed again.

In an embodiment, in the step (p), a frequency range of the additional primary transmission channel is determined by the wireless transmitter, and the frequency range of the additional primary transmission channel is identical or close to the frequency range of the dynamically selected secondary transmission channel.

In an embodiment, after the step (i) and before the step (j), the data transmission method further includes the following steps. A step (i1) is performed to judge whether the wireless transmitter sends an acknowledgement request. In a step (i2), if the wireless transmitter sends the acknowledgement request, the step (j) is performed. In a step (i3), if the wireless transmitter does not send the acknowledgement request, the wireless transmitter continuously sends the wireless transmission data through the primary transmission channel for several times within a fifth time interval, and the step (h) is performed. Consequently, the wireless transmitter waits for another triggering event.

In an embodiment, the step (h) includes the following sub-steps. A step (h1) is performed to judge whether the triggering event is generated. In a step (h2), if the triggering event is generated, the step (i) is performed. In a step (h3), if no triggering event is generated, the wireless transmitter sends a virtual synchronous packet as the wireless transmission data through the primary transmission channel within a sixth time interval, and the step (i1) is performed.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purposes of illustration and description only. In the following embodiments and drawings, the elements irrelevant to the concepts of the present invention are omitted and not shown.

Figure 2:
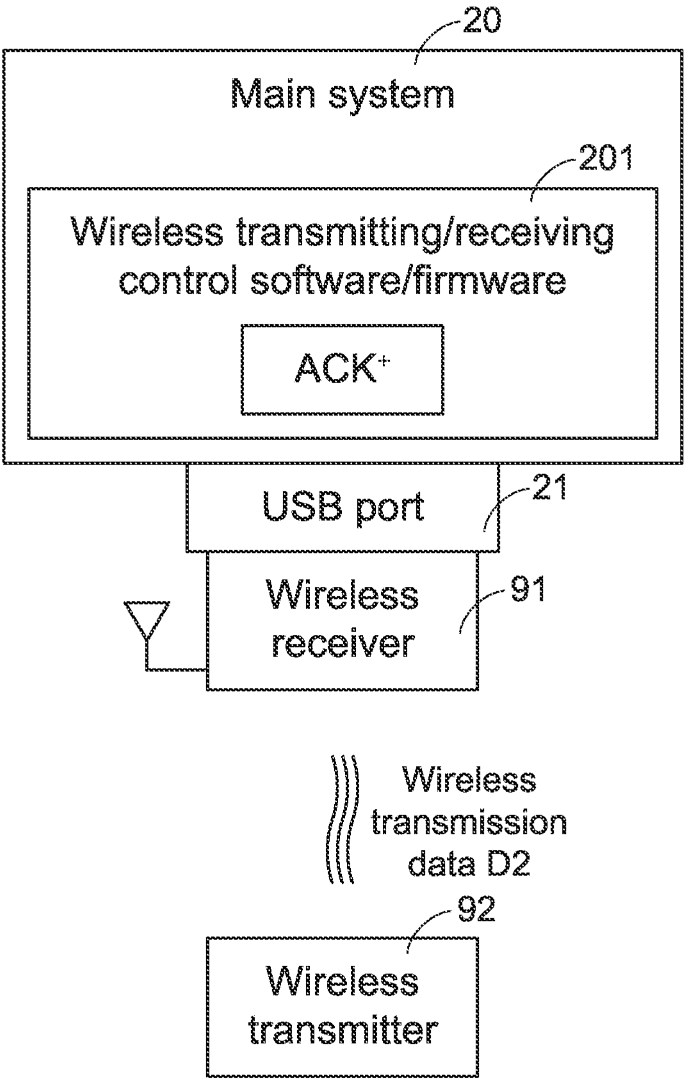
FIG. 2 is a schematic functional block diagram illustrating the relationship between a wireless peripheral device and a main system according to an embodiment of the present invention.

The present invention provides a data transmission method for a wireless peripheral device. FIG. 2 is a schematic functional block diagram illustrating the relationship between a wireless peripheral device and a main system according to an embodiment of the present invention. Some embodiments of the data transmission method will be described as follows. In these embodiments, the data transmission method is used between the wireless peripheral device and the main system 20. As shown in FIG. 2, the wireless peripheral device comprises a wireless receiver 91 and a wireless transmitter 92. The wireless receiver 91 is electrically connected with a USB port 21 of the main system 20 directly. Moreover, under control of a wireless transmitting/receiving control software/firmware 201, the wireless receiver 91 and the wireless transmitter 92 are in communication with each other to transmit/receive a wireless transmission data D2. In accordance with a feature of the present invention, a special acknowledgement packet (ACK+) with a-loadable information is employed during the process of transmitting/receiving the wireless transmission data D2. The acknowledgement packet will be described later. In this way, the drawbacks of the conventional technologies can be overcome, and the diversity of the transmission data content and the application flexibility will be increased.

The wireless peripheral device applied to the present invention includes but is not limited to a wireless mouse, a wireless keyboard, a wireless microphone, a wireless headset or any other appropriate wireless electronic device.

The wireless receiver 91 is usually in a receiving mode (Rx mode), but the wireless receiver 91 is temporarily switched to a transmitting mode (Tx mode) when necessary. The wireless transmitter 92 is usually in the transmitting mode, but the wireless transmitter 92 is temporarily switched to the receiving mode when necessary. The detailed descriptions will be omitted herein.

Figure 3A:
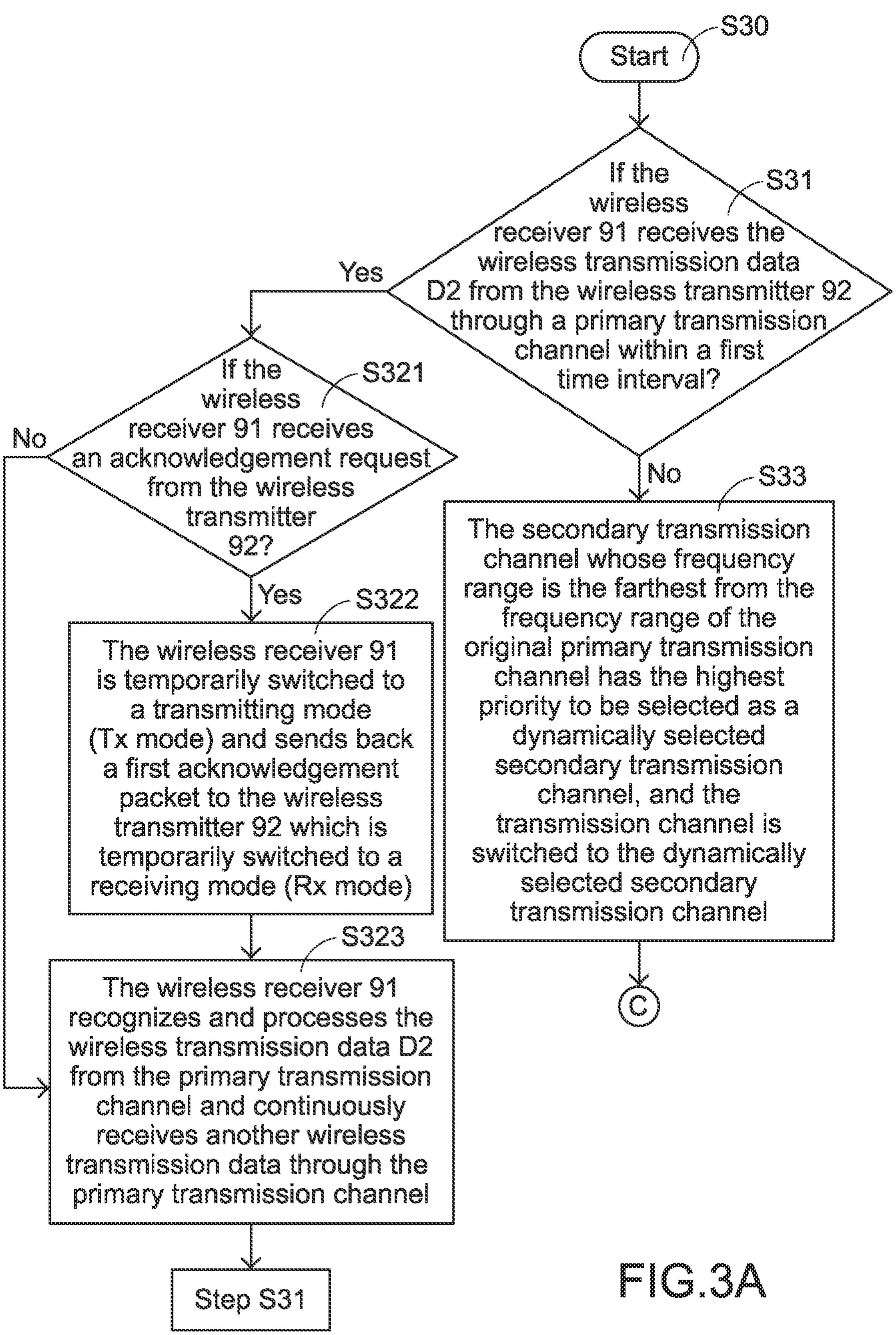
FIGS. 3A and 3B illustrate a flowchart of a data receiving process of a data transmission method according to an embodiment of the present invention.
Figure 3B:
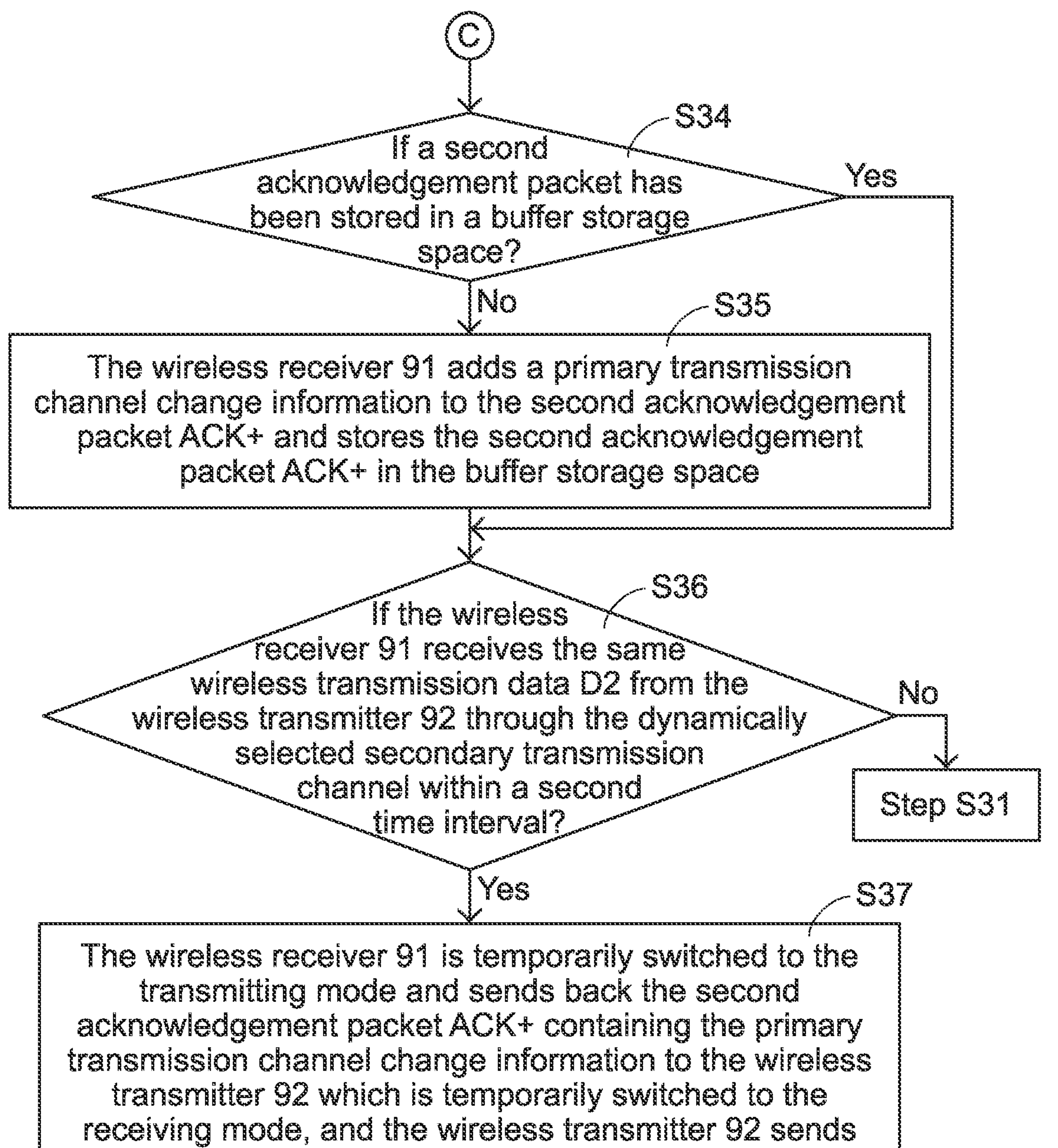

FIGS. 3A and 3B illustrate a flowchart of a data receiving process of a data transmission method according to an embodiment of the present invention. Please also refer to FIG. 2.

The data receiving process is implemented by the wireless receiver 91. As shown in FIGS. 3A and 3B, the data receiving process of the data transmission method in the first embodiment of the present invention at least comprises the following steps.

In a step S30, the data receiving process is started.

Then, a step S31 is performed to judge whether the wireless receiver 91 receives the wireless transmission data D2 from the wireless transmitter 92 through a primary transmission channel within a first time interval. For example, the channel number of the primary transmission channels is at least 13, and the first time interval is at least 8~16 millisecond (ms).

If the wireless receiver 91 receives the wireless transmission data D2 through the primary transmission channel, a step S321 is performed to judge whether the wireless receiver 91 receives an acknowledgement request from the wireless transmitter 92.

If no acknowledgement request from the wireless transmitter 92 is received, the wireless receiver 91 directly recognizes and processes the wireless transmission data D2 from the primary transmission channel and continuously receives an-additional wireless transmission data through the primary transmission channel (Step S323). Then, the step S31 is performed again.

If the wireless transmission data D2 is received through the primary transmission channel and the acknowledgement request from the wireless transmitter 92 is received, the wireless receiver 91 is temporarily switched to a transmitting mode (Tx mode) and sends back a first acknowledgement packet to the wireless transmitter 92 which is temporarily switched to a receiving mode (Rx mode) (Step S322). If the wireless receiver 91 recognizes that the wireless transmission data D2 comes from the primary transmission channel, the wireless receiver 91 processes the wireless transmission data D2 and continuously receives the additional wireless transmission data through the primary transmission channel (Step S323). Then, the step S31 is performed again. For example, the first acknowledgement packet is a general acknowledgement packet without loadable information.

If the judging result of the step S31 indicates that the wireless receiver 91 has not received the wireless transmission data D2 through the primary transmission channel, a step S33 is performed. That is, among plural secondary transmission channels, the secondary transmission channel whose frequency range is the farthest from the frequency range of the original primary transmission channel has the highest priority to be selected as a dynamically selected secondary transmission channel, and the transmission channel is switched to the dynamically selected secondary transmission channel. In other words, the secondary transmission channel that has not been interfered and is the farthest from the frequency range of the primary transmission channel is selected from the plural secondary transmission channels as the dynamically selected secondary transmission channel by the wireless receiver 91.

An implementation example of the step S33 will be described as follows. It is assumed that the wireless transmission data D2 cannot be received through the primary transmission channel because of the interference situation. For example, the frequency of the primary transmission channel is 30 kHz, and the frequencies of the three secondary transmission channels include 15 kHz, 70 KHz and 105 kHz. Among the three secondary transmission channels, the secondary transmission channel with the frequency of 105 kHz is the farthest from the primary transmission channel with the frequency of 30 kHz. That is, in the step S33, the secondary transmission channel with the frequency of 105 kHz is the dynamically selected secondary transmission channel and continuously used.

In an embodiment, the at least one secondary transmission channel includes two or more than two secondary transmission channels.

If the wireless receiver 91 has not received the wireless transmission data D2 through the primary transmission channel, a step S34 is performed after the step S33. In the step S34, the wireless receiver 91 checks whether a second acknowledgement packet has been stored in a buffer storage space. In an embodiment, the buffer storage space is installed in one of the main system 20 and the wireless receiver 91 as shown in FIG. 2. Preferably, the second acknowledgement packet is a special acknowledgement packet (ACK+) with loadable information. That is, required control information can be additionally loaded to the second acknowledgement packet.

If the second acknowledgement packet ACK+ has not been stored in the buffer storage space, the wireless receiver 91 adds a primary transmission channel change information to the second acknowledgement packet ACK+ and stores the second acknowledgement packet ACK+ in the buffer storage space (Step S35).

If the second acknowledgement packet ACK+ has been stored in the buffer storage space, a step S36 is performed to judge whether the wireless receiver 91 receives the same wireless transmission data D2 from the wireless transmitter 92 through the dynamically selected secondary transmission channel within a second time interval. If no wireless transmission data D2 is received through the dynamically selected secondary transmission channel, the step S31 is performed again. In an embodiment, the second time interval is at least 2~4 millisecond (ms).

If the wireless transmission data D2 is received through the dynamically selected secondary transmission channel, the wireless receiver 91 is temporarily switched to the transmitting mode and sends back the second acknowledgement t packet ACK+ containing the primary transmission channel change information to the wireless transmitter 92, which is temporarily switched to the receiving mode. In addition, the wireless transmitter 92 sends the additional wireless transmission data through an additional primary transmission channel in response to the primary transmission channel change information (Step S37).

If the wireless receiver 91 recognizes that the wireless transmission data D2 comes from the dynamically selected secondary transmission channel, the wireless receiver 91 processes the wireless transmission data D2 and continuously receives the additional wireless transmission data through the additional primary transmission channel that has not been occupied (Step S38). Then, the step S31 is performed again.

In an embodiment of the step S38, the frequency range of the additional primary transmission channel is selectively determined by the wireless receiver 91 and identical or close to the frequency range of the dynamically selected secondary transmission channel. For example, the frequency range of the additional primary transmission channel in the step S38 is identical or close to the frequency range of the dynamically selected secondary transmission channel described in the step S33 (e.g., 105 kHz).

In an embodiment, the step S321 and the step S322 are selectively used to additionally provide a processing mechanism. If no acknowledgement request from the wireless transmitter 92 is received, the step S322 is omitted. That is, the wireless receiver 91 does not need to send back the first acknowledgement packet to the wireless transmitter 92. Consequently, the overall data transmission efficiency is enhanced.

As previously described, the conventional data transmission method has some drawbacks. For example, the wireless transmitter has to issue the primary transmission channel change notification through at least one secondary transmission channel. After the wireless receiver responds to the confirmation of receiving the primary transmission channel change notification, the wireless transmitter re-sends the same wireless transmission data or sends the additional wireless transmission data. In other words, the conventional data transmission method has a transmission delay problem. The data transmission method of the present invention is advantageous over the conventional data transmission method. If the wireless receiver 91 has not received the wireless transmission data D2 from the wireless transmitter 92 through the primary transmission channel, the wireless receiver 91 can still receive the wireless transmission data D2 through the dynamically selected secondary transmission channel.

It is assumed that the wireless transmission data D2 cannot be received through the primary transmission channel because of the interference situation. For example, the frequency of the primary transmission channel is 30 kHz. In the interference situation, the wireless receiver 91 cannot receive the wireless transmission data D2 through the primary transmission channel. In accordance with a feature of the present invention, the secondary transmission channel whose frequency range is the farthest from the frequency range of the original primary transmission channel has the highest priority to be selected as the dynamically selected secondary transmission channel. For example, the frequencies of three secondary transmission channels include 15 kHz, 70 kHz and 105 kHz. Among the three secondary transmission channels, the secondary transmission channel with the frequency of 105 kHz is the farthest from the primary transmission channel with the frequency of 30 kHz. As previously described, if the wireless receiver is unable to receive the wireless transmission data, the conventional data transmission method selects the secondary transmission channel in a broadcast polling. For example, the secondary transmission channel with the frequency of 15 kHz is firstly selected to try to receive the wireless transmission data D2. In the interference situation, the secondary transmission channel with the frequency of 70 kHz and the secondary transmission channel with the frequency of 105 kHz are sequentially selected to try to receive the wireless transmission data D2. When compared with the conventional data transmission method, the data transmission method of the present invention is more efficient.

Figure 1A:
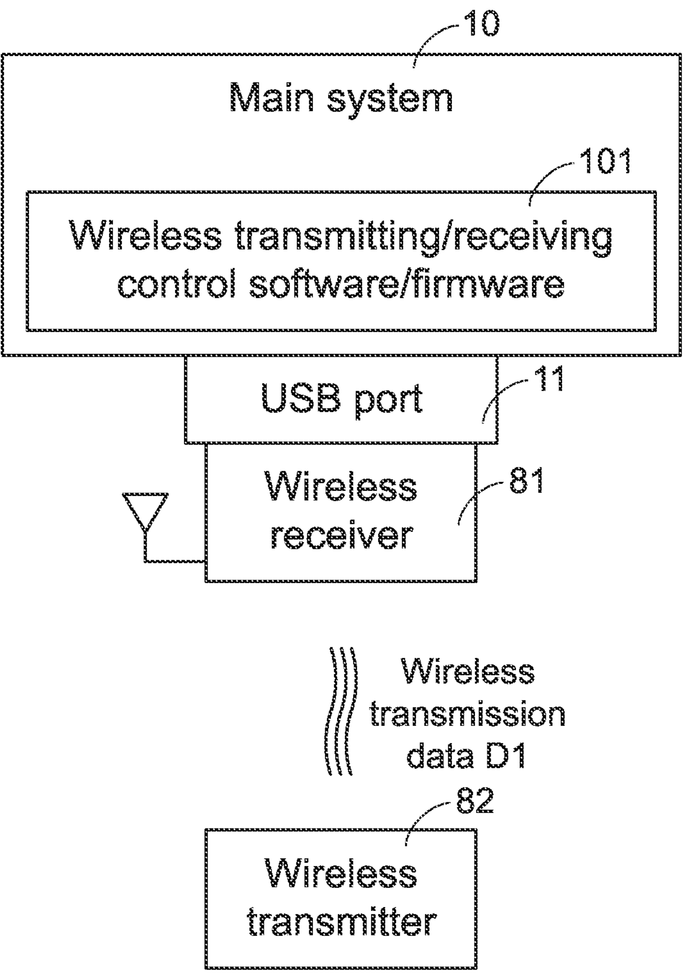
FIG. 1A is a schematic functional block diagram illustrating the relationship between a conventional wireless peripheral device and a main system.
Figure 1B:
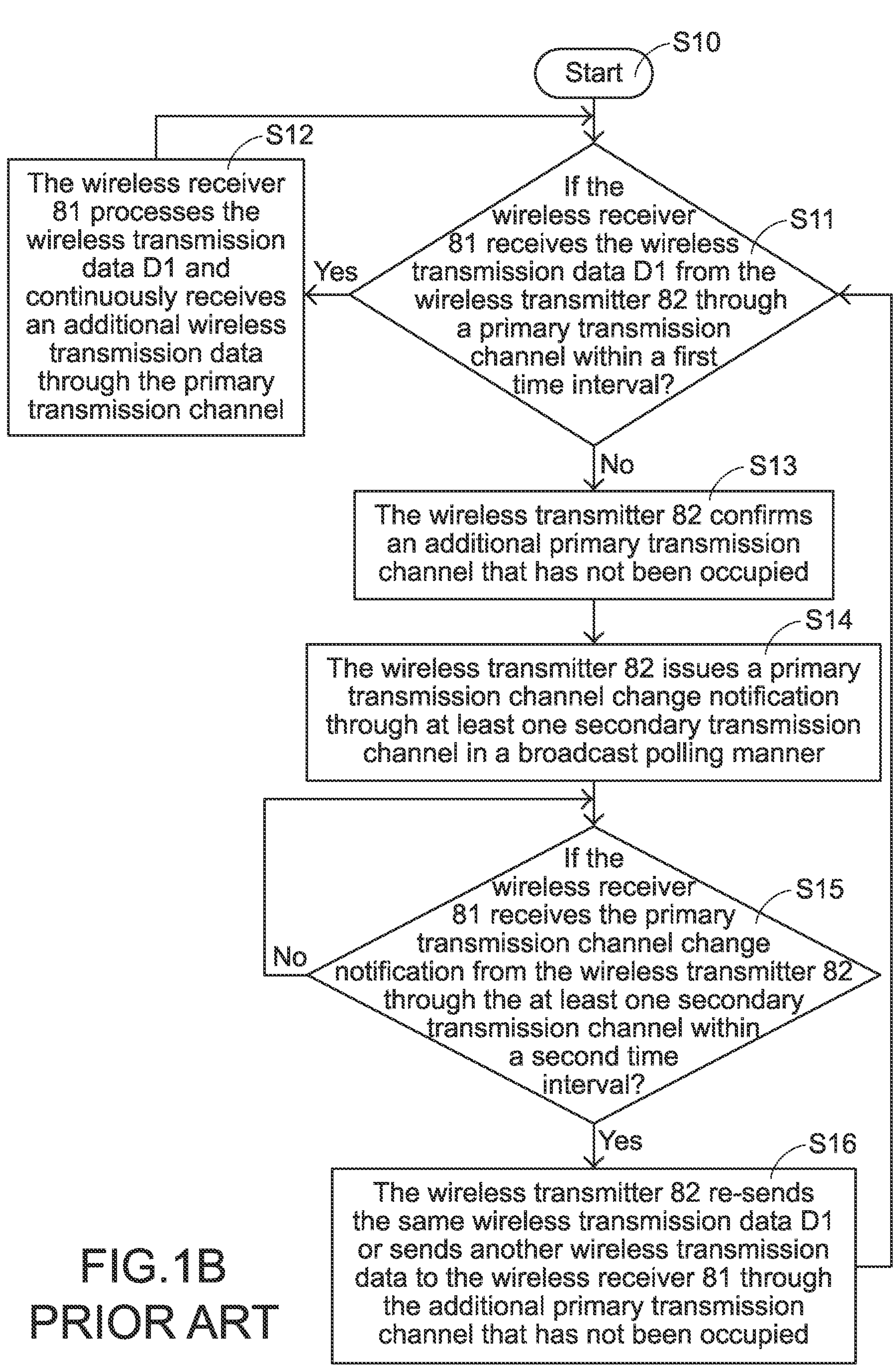
FIG. 1B is a flowchart illustrating a data transmission method for use in a frequency hopping procedure of a conventional wireless peripheral device.

According to the conventional technology, the master control power of the frequency hopping procedure is manipulated by the wireless transmitter 82 as shown in FIG. 1A. In accordance with the present invention, when the wireless receiver 91 receives the wireless transmission data D2 through the dynamically selected secondary transmission channel, the wireless receiver 91 actively sends back the second acknowledgement packet ACK+ containing the primary transmission channel change information to the wireless transmitter 92. In other words, the master control power of the frequency hopping procedure is actively manipulated by the wireless receiver 91 as shown in FIG. 2. In this way, the wireless receiver 91 is suitably used to control and manage plural wireless transmitters 92 simultaneously.

Moreover, the acknowledgement packet ACK+ containing the primary transmission channel change information is previously placed and early prepared in the buffer storage space. The early preparation can obviously reduce the time period of the conversion and communication of transmitting/receiving the wireless transmission data D2.

Figure 4A:
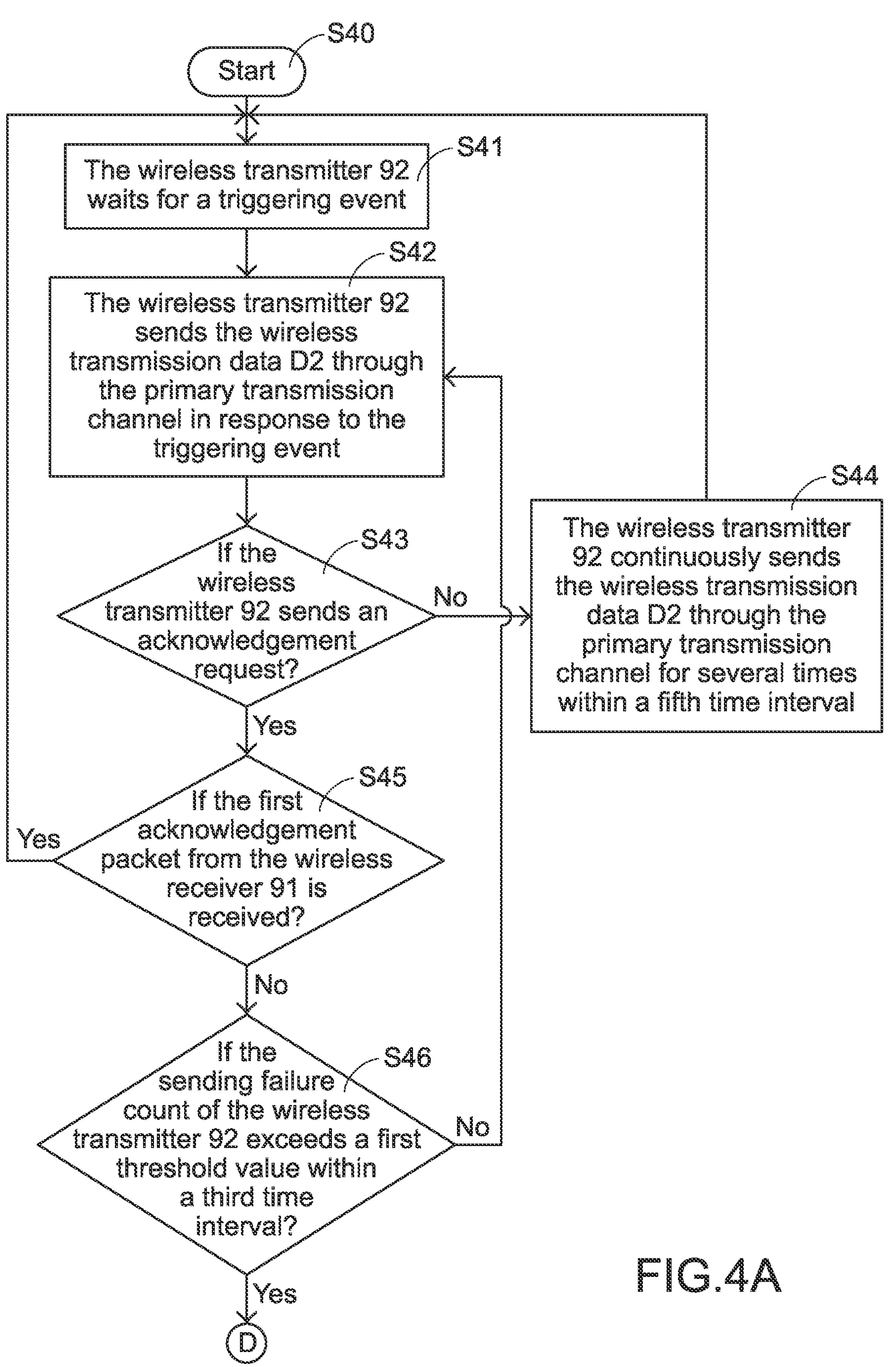
FIGS. 4A and 4B illustrate a flowchart of an exemplary data sending process in the data transmission method according to the embodiment of the present invention.
Figure 4B:
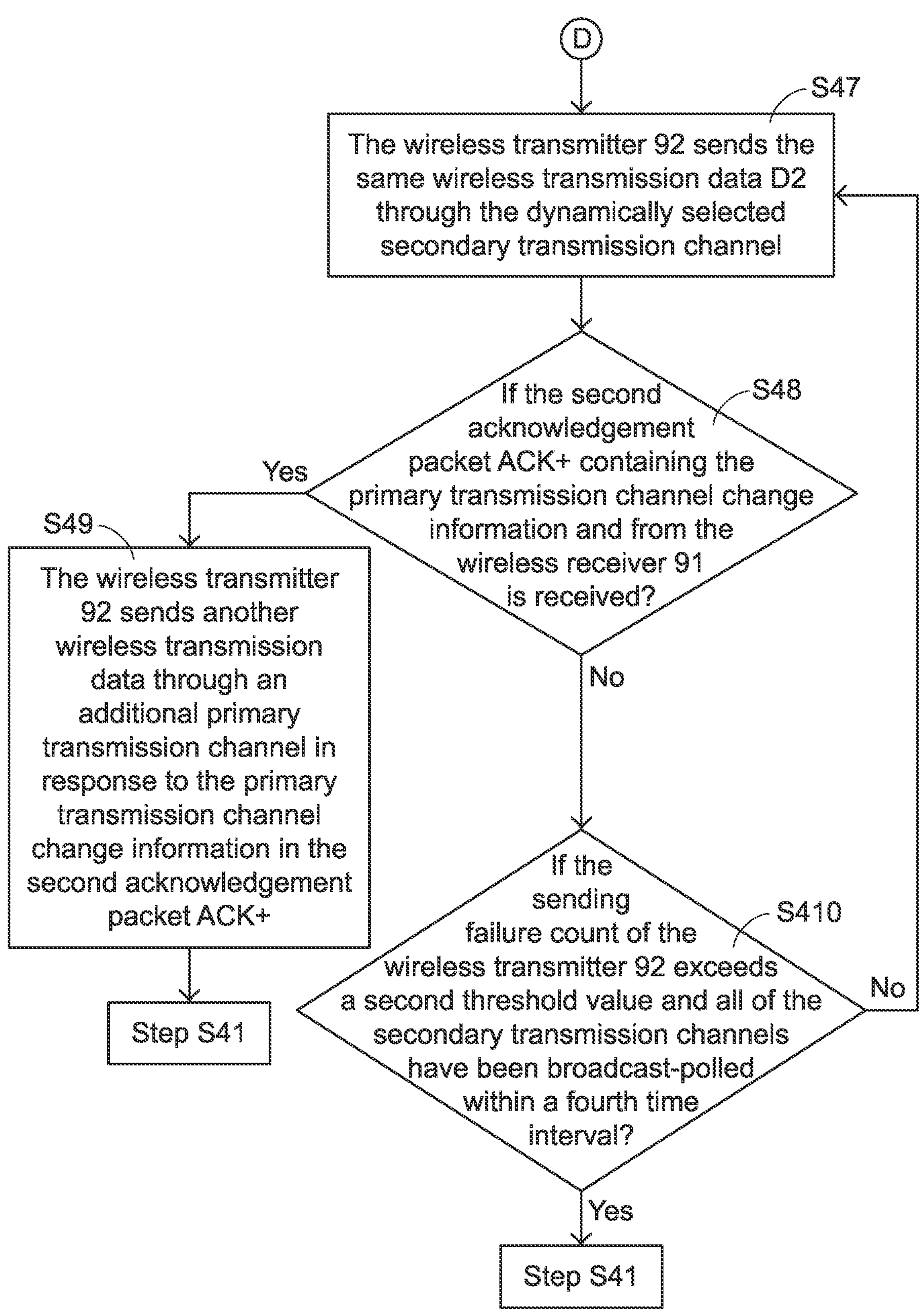

As mentioned above, the wireless receiver 91 can receive the wireless transmission data D2 through the dynamically selected secondary transmission channel directly, and the master control power of the frequency hopping procedure is manipulated by the wireless receiver 91. The detailed operations can be further understood with reference to the flowchart of FIGS. 4A and 4B. FIGS. 4A and 4B illustrate a flowchart of an exemplary data sending process in the data transmission method according to the embodiment of the present invention. Please also refer to FIGS. 2, 3A and 3B.

The wireless transmitter 92 cooperates with the wireless receiver 91 to implement the data sending process. As shown in FIGS. 4A and 4B, the data sending process of the data transmission method at least comprises the following steps.

In a step S40, the data sending process is started.

In a step S41, the wireless transmitter 92 waits for a triggering event.

In a step S42, the wireless transmitter 92 sends the wireless transmission data D2 through the primary transmission channel in response to the triggering event.

Then, a step S43 is performed to judge whether the wireless transmitter 92 sends an acknowledgement request.

If the judging result of the step S43 is not satisfied, the wireless transmitter 92 continuously sends the wireless transmission data D2 through the primary transmission channel for several times within a fifth time interval (Step S44). Then, the step S41 is performed again, and the wireless transmitter 92 waits for another triggering event.

If the judging result of the step S43 is satisfied, a step S45 is performed to judge whether the wireless transmitter 92 receives the first acknowledgement packet from the wireless receiver 91. If the first acknowledgement packet from the wireless receiver 91 is received, the wireless transmitter 92 continuously waits for another triggering event. That is, the step S41 is performed again.

If the first acknowledgement packet from the wireless receiver 91 is not received, a step S46 is performed to judge whether the sending failure count of the wireless transmitter 92 exceeds a first threshold value within a third time interval. If the sending failure count of the wireless transmitter 92 does not exceed the first threshold value, the step S42 is performed again. Consequently, the wireless transmitter 92 continuously sends the wireless transmission data D2 through the primary transmission channel. For example, the first threshold value corresponding to the sending failure count is 8.

If the judging result of the step S46 indicates that the sending failure count of the wireless transmitter 92 exceeds the first threshold value, the wireless transmitter 92 sends the same wireless transmission data D2 through the dynamically selected secondary transmission channel (Step S47). The method of determining the dynamically selected secondary transmission channel by the wireless transmitter 92 is similar to the method of determining the dynamically selected secondary transmission channel by the wireless receiver 91. In other words, the secondary transmission channel that has not been interfered and is the farthest from the frequency range of the primary transmission channel is selected from the plural secondary transmission channels as the dynamically selected secondary transmission channel by the wireless transmitter 92.

After the step S47, a step S48 is performed to judge whether the second acknowledgement packet ACK+ containing the primary transmission channel change information and from the wireless receiver 91 is received.

If the second acknowledgement packet ACK+ containing the primary transmission channel change information and from the wireless receiver 91 is received, the wireless transmitter 92 sends the additional wireless transmission data through an additional primary transmission channel in response to the primary transmission channel change information in the second acknowledgement packet ACK+ (Step S49), and the step S41 is performed again.

In an embodiment of the step S49, the frequency range of the additional primary transmission channel is selectively determined by the wireless transmitter 92 and identical or close to the frequency range of the dynamically selected secondary transmission channel.

If the judging result of the step S48 indicates that the second acknowledgement packet ACK+ containing the primary transmission channel change information from the wireless receiver 91 is not received, a step S410 is performed to judge whether the sending failure count of the wireless transmitter 92 exceeds a second threshold value and all of the secondary transmission channels have been broadcast-polled within a fourth time interval. If the sending failure count of the wireless transmitter 92 does not exceed the second threshold value or all of the secondary transmission channels have not been broadcast-polled, the step S47 is performed again. Consequently, the wireless transmitter 92 continuously sends the same wireless transmission data D2 through the dynamically selected secondary transmission channel (i.e., the secondary transmission channel that has not been interfered and is the farthest from the frequency range of the primary transmission channel) until the sending failure count of the wireless transmitter 92 exceeds the second threshold value and all of the secondary transmission channels have been broadcast-polled. For example, the second threshold value corresponding to the sending failure count is 8.

As mentioned above, the data sending process implemented by the wireless transmitter 92 according to the present technology is advantageous over the conventional technology. If the first acknowledgement packet from the wireless receiver 91 has not been received after a certain time period, the wireless transmitter 92 sends the same wireless transmission data D2 through the dynamically selected secondary transmission channel directly. This process is unlike the conventional technology. In other words, it is not necessary to receive the primary transmission channel change notification through the at least one secondary transmission channel before the wireless transmission data is sent.

As mentioned above, the second acknowledgement packet ACK+ contains the primary transmission channel change information. In some embodiments, the second acknowledgement packet ACK+ further contains a wireless receiver time sequence information or an application function information for controlling the wireless transmitter. Consequently, the diversity and the application flexibility of the information control capability of the wireless receiver 91 to control the wireless transmitter 92 in the communication application level can be increased.

In the above embodiment, the data sending method selectively comprises the steps S43 and S44 in order to increase the data transmission speed. That is, the wireless transmitter 92 has a processing mechanism for determining whether the acknowledgement request needs to be sent. If the wireless transmitter 92 determines that the acknowledgement request does not need to be sent, the wireless transmitter 92 continuously sends the same wireless transmission data D2 through the primary transmission channel for several times within the certain time interval. Since the wireless receiver 91 cooperates with the wireless transmitter 92, the wireless receiver 91 can use the processing mechanism of the step S321 as shown in FIGS. 3A and 3B to increase the data transmission speed between the wireless receiver 91 and the wireless transmitter 92.

It is noted that numerous modifications and alterations may be made while retaining the teachings of the invention. For example, in another embodiment, the data sending process is implemented when the wireless peripheral device is in an idle state (i.e., the triggering event is not generated). Consequently, when the frequency hopping procedure is performed or when the wireless peripheral device is in the idle state, the diversity and the application flexibility of the information control capability of the wireless receiver 91 to control the wireless transmitter 92 in the communication application level can be increased.

Figure 5A:
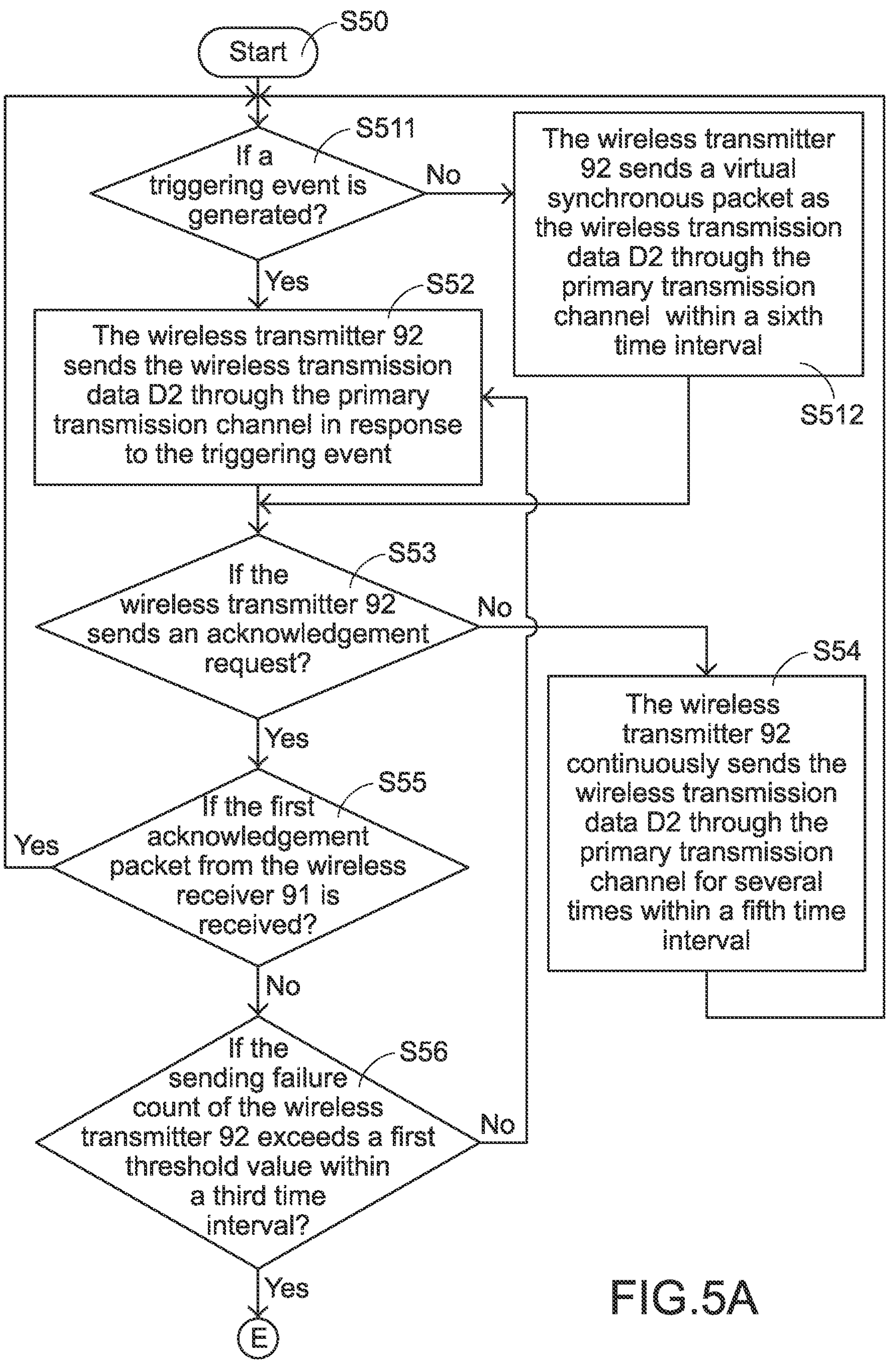
FIGS. 5A and 5B illustrate a flowchart of another exemplary data sending process in the data transmission method according to the embodiment of the present invention.
Figure 5B:
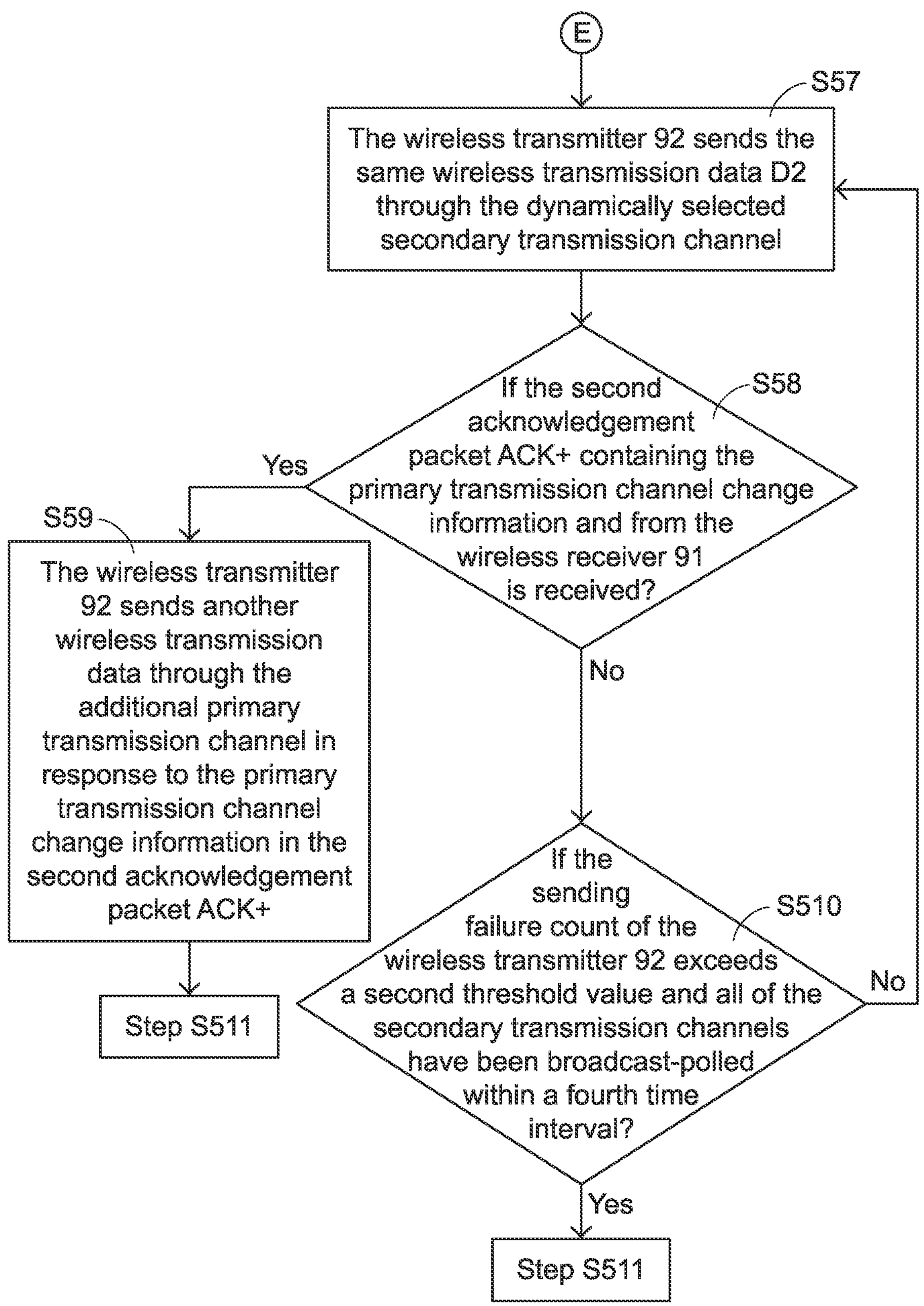

The implementation steps will be illustrated with reference to the flowchart of FIGS. 5A and 5B. FIGS. 5A and 5B illustrate a flowchart of another exemplary data sending process in the data transmission method according to the embodiment of the present invention. Moreover, the wireless transmitter 92 cooperates with the wireless receiver 91 to implement the data sending process. The implementation steps S52 to S510 of this embodiment are identical or equivalent to the implementation steps S42 to S410 as shown in FIGS. 4A and 4B, and not redundantly described herein.

In comparison with the embodiment of FIGS. 4A and 4B, the step S41 of waiting for the triggering event in FIGS. 4A and 4B is modified to the following steps of this embodiment.

In the step of waiting for the triggering event, a step S511 is performed to judge whether the triggering event is generated. If the judging result of the step S511 indicates that the triggering event is generated, a step S52 is performed. In the step S52, the wireless transmitter 92 sends the wireless transmission data D2 through the primary transmission channel in response to the triggering event.

If no triggering event is generated, the wireless transmitter 92 sends a virtual synchronous packet as the wireless transmission data D2 through the primary transmission channel within a sixth time interval (Step S512). Then, the step S53 is performed to judge whether the wireless transmitter 92 sends an acknowledgement request. Then, the subsequent steps are performed.

As mentioned in the embodiment of FIGS. 5A and 5B, the wireless transmitter 92 sends a virtual synchronous packet as the wireless transmission data D2 when the wireless transmitter 92 is in the idle state (i.e., the triggering event is not generated). That is, a virtual data-transmitting action is performed. Consequently, the wireless receiver 91 can enable the frequency hopping procedure or issue some loadable information through the second acknowledgement packet ACK+. Consequently, the lighting effect, the adjustment sensitivity, the sound effect or any other appropriate application level of the wireless transmitter 92 can be correspondingly controlled.

While the invention has been described in terms of what is presently considered to be the most practical and preferred embodiments, it is to be understood that the invention needs-need not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A data transmission method for use between a wireless transmitter and a wireless receiver of a wireless peripheral device, the data transmission method comprising a data receiving process, the data receiving process being implemented by the wireless receiver, the data receiving process at least comprising steps of:

(a) judging whether a wireless transmission data from the wireless transmitter is received through a primary transmission channel within a first time interval;

(b) if the wireless transmission data from the primary transmission channel is received, allowing the wireless receiver to be temporarily switched to a transmitting mode and allowing the wireless receiver to send back a first acknowledgement packet to the wireless transmitter, which is temporarily switched to a receiving mode;

(c) recognizing and processing the wireless transmission data from the primary transmission channel, and continuously receiving additional wireless transmission data through the primary transmission channel, and performing the step (a) again;

(d) if the wireless transmission data is not received through the primary transmission channel, switching to a dynamically selected secondary transmission channel, wherein among plural secondary transmission channels, the secondary transmission channel that is not interfered and whose frequency range is the farthest from a frequency range of the primary transmission channel has the highest priority to be selected as the dynamically selected secondary transmission channel by the wireless receiver;

(e) judging whether the same wireless transmission data through the dynamically selected secondary transmission channel is received within a second time interval;

(f) if the wireless transmission data is received through the dynamically selected secondary transmission channel, allowing the wireless receiver to be temporarily switched to the transmitting mode, and allowing the wireless receiver to send back a second acknowledgement packet to the wireless transmitter, which is temporarily switched to the receiving mode, wherein the second acknowledgement packet contains at least one of a primary transmission channel change information, a wireless receiver time sequence information and an application function information for controlling the wireless transmitter, and the wireless transmitter sends the additional wireless transmission data through an additional primary transmission channel in response to the primary transmission channel change information; and (g) recognizing and processing the wireless transmission data from the dynamically selected secondary transmission channel, continuously receiving the additional wireless transmission data through the additional primary transmission channel that has not been occupied, and then performing the step (a) again, wherein after the step (d) and before the step (e), the data transmission method further comprises steps of:

(d1) if the wireless transmission data is not received through the primary transmission channel, checking whether the second acknowledgement packet has been stored in a buffer storage space;

(d2) if the second acknowledgement packet has been stored in the buffer storage space, performing the step (e); and (d3) if the second acknowledgement packet has not been stored in the buffer storage space, allowing the wireless receiver to add the primary transmission channel change information to the second acknowledgement packet and store the second acknowledgement packet in the buffer storage space, and performing the step (e).

2. The data transmission method according to claim 1, wherein after the step (a) and before the step (b), the data transmission method further comprises steps of:

(a1) if the wireless transmission data from the primary transmission channel is received, judging whether an acknowledgement request from the wireless transmitter is received;

(a2) if no acknowledgement request from the wireless transmitter is received, performing the step (c); and (a3) if the acknowledgement request from the wireless transmitter is received, allowing the wireless receiver to be temporarily switched to the transmitting mode and allowing the wireless receiver to send back the first acknowledgement packet to the wireless transmitter which is temporarily switched to a receiving mode, and performing the step (c).

3. The data transmission method according to claim 1, wherein in the step (f), a frequency range of the additional primary transmission channel is determined by the wireless receiver, and the frequency range of the additional primary transmission channel is identical or close to the frequency range of the dynamically selected secondary transmission channel.

4. The data transmission method according to claim 3, wherein the primary transmission channel and the additional primary transmission channel are included in plural primary transmission channels.

5. The data transmission method according to claim 1, wherein the data transmission method further comprises a data sending process, and the data sending process is implemented by the wireless transmitter, wherein the data sending process at least comprises steps of:

(h) waiting for a triggering event;

(i) the wireless transmitter sending the wireless transmission data through the primary transmission channel in response to the triggering event;

(j) judging whether the first acknowledgement packet from the wireless receiver is received;

(k) if the first acknowledgement packet from the wireless receiver is received, performing the step (h) again, so that the wireless transmitter continuously waits for another triggering event;

(l) if the first acknowledgement packet from the wireless receiver is not received, judging whether a sending failure count of the wireless transmitter exceeds a first threshold value within a third time interval;

(m) if the sending failure count of the wireless transmitter does not exceed the first threshold value, performing the step (i) again, so that the wireless transmitter continuously sends the wireless transmission data through the primary transmission channel;

(n) if the sending failure count of the wireless transmitter exceeds the first threshold value, the wireless transmitter sending the same wireless transmission data through the dynamically selected secondary transmission channel, wherein among the plural secondary transmission channels, the secondary transmission channel that is not interfered and whose frequency range is the farthest from the frequency range of the primary transmission channel has the highest priority to be selected as the dynamically selected secondary transmission channel by the wireless transmitter;

(o) judging whether the second acknowledgement packet from the wireless receiver is received, wherein the second acknowledgement packet contains at least one of the primary transmission channel change information, the wireless receiver time sequence information and the application function information for controlling the wireless transmitter;

(p) if the second acknowledgement packet containing the primary transmission channel change information and from the wireless receiver is received, the wireless transmitter sending the additional wireless transmission data through the additional primary transmission channel in response to the primary transmission channel change information, and performing the step (h) again; and (q) if the second acknowledgement packet containing the primary transmission channel change information and from the wireless receiver is not received, judging whether the sending failure count of the wireless transmitter exceeds a second threshold value and all of the plural secondary transmission channels have been broadcast-polled within a second time interval, wherein if the wireless transmitter does not exceed the second threshold value or all of the plural secondary transmission channels have not been broadcast-polled, the wireless transmitter continuously sends the same wireless transmission data through the dynamically selected secondary transmission channels until the sending failure count of the wireless transmitter exceeds the second threshold value and all of the plural secondary transmission channels have been broadcast-polled, and performing the step (h) again.

6. The data transmission method according to claim 5, wherein in the step (p), a frequency range of the additional primary transmission channel is determined by the wireless transmitter, and the frequency range of the additional primary transmission channel is identical or close to the frequency range of the dynamically selected secondary transmission channel.

7. The data transmission method according to claim 5, wherein after the step (i) and before the step (j), the data transmission method further comprises steps of:

(i1) judging whether the wireless transmitter sends an acknowledgement request;

(i2) if the wireless transmitter sends the acknowledgement request, performing the step (j); and (i3) if the wireless transmitter does not send the acknowledgement request, the wireless transmitter continuously sends the wireless transmission data through the primary transmission channel for several times within a fifth time interval, and performing the step (h), so that the wireless transmitter waits for another triggering event.

8. The data transmission method according to claim 7, wherein the step (h) comprises sub-steps of:

(h1) judging whether the triggering event is generated;

(h2) if the triggering event is generated, performing the step (i); and (h3) if no triggering event is generated, the wireless transmitter sending a virtual synchronous packet as the wireless transmission data through the primary transmission channel within a sixth time interval, and performing the step (i1).

* * * * *